(12) United States Patent
Baron

(10) Patent No.: US 10,953,354 B2
(45) Date of Patent: *Mar. 23, 2021

(54) FILTER ELEMENT

(71) Applicant: CLEAR EDGE-GERMANY GMBH, Geldern-Walbeck (DE)

(72) Inventor: Dominic Baron, Bolton (GB)

(73) Assignee: CLEAR EDGE-GERMANY GMBH, Geldern-Walbeck (DE)

( * ) Notice: Subject to any disclaimer, the term of this patent is extended or adjusted under 35 U.S.C. 154(b) by 37 days.

This patent is subject to a terminal disclaimer.

(21) Appl. No.: 16/179,530

(22) Filed: Nov. 2, 2018

(65) Prior Publication Data

US 2019/0070539 A1    Mar. 7, 2019

Related U.S. Application Data

(63) Continuation-in-part of application No. 14/915,200, filed as application No. PCT/EP2014/068413 on Aug. 29, 2014, now abandoned.

(30) Foreign Application Priority Data

Aug. 29, 2013 (GB) ...................... 1315363

(51) Int. Cl.
| | |
|---|---|
| *B01D 39/08* | (2006.01) |
| *B01D 25/127* | (2006.01) |
| *D03D 1/00* | (2006.01) |
| *D03D 11/00* | (2006.01) |
| *B01D 25/12* | (2006.01) |

(52) U.S. Cl.
CPC ........... *B01D 39/083* (2013.01); *B01D 25/12* (2013.01); *B01D 25/1275* (2013.01); *D03D 1/0094* (2013.01); *D03D 11/00* (2013.01); *B01D 2239/065* (2013.01); *B01D 2239/0613* (2013.01); *D03D 2700/0159* (2013.01); *D03D 2700/02* (2013.01); *D10B 2321/021* (2013.01); *D10B 2321/022* (2013.01); *D10B 2331/02* (2013.01); *D10B 2331/021* (2013.01); *D10B 2331/04* (2013.01); *D10B 2331/301* (2013.01); *D10B 2505/04* (2013.01)

(58) Field of Classification Search
CPC ...... B01D 2239/0478; B01D 2239/065; B01D 39/083

See application file for complete search history.

(56) References Cited

U.S. PATENT DOCUMENTS

| | | |
|---|---|---|
| 5,795,835 A | 8/1998 | Bruner |
| 2016/0206983 A1 | 7/2016 | Baron |

FOREIGN PATENT DOCUMENTS

| | | |
|---|---|---|
| EP | 0048962 A2 | 4/1982 |
| WO | 2015/028628 A1 | 3/2015 |

OTHER PUBLICATIONS

Patent Cooperation Treaty: International Preliminary Report on Patentability for PCT/EP2014/068413 dated Mar. 1, 2016; 5 pages.
Patent Cooperation Treaty: International Search Report and Written Opinion for PCT/EP2014/068413 dated Jan. 1, 2015; 7 pages.

*Primary Examiner* — Dirk R Bass
(74) *Attorney, Agent, or Firm* — Schwabe Williamson & Wyatt, PC

(57) ABSTRACT

A filter element comprising two layers of weft (1) interlaced with warp (2). Additionally laid-in (3) yarns are provided in-between the two weft layers. The laid-in yarns (3) are not interlaced with the weft.

10 Claims, 2 Drawing Sheets

FILTER ELEMENT

CROSS-REFERENCE TO RELATED APPLICATIONS

Figure 1:
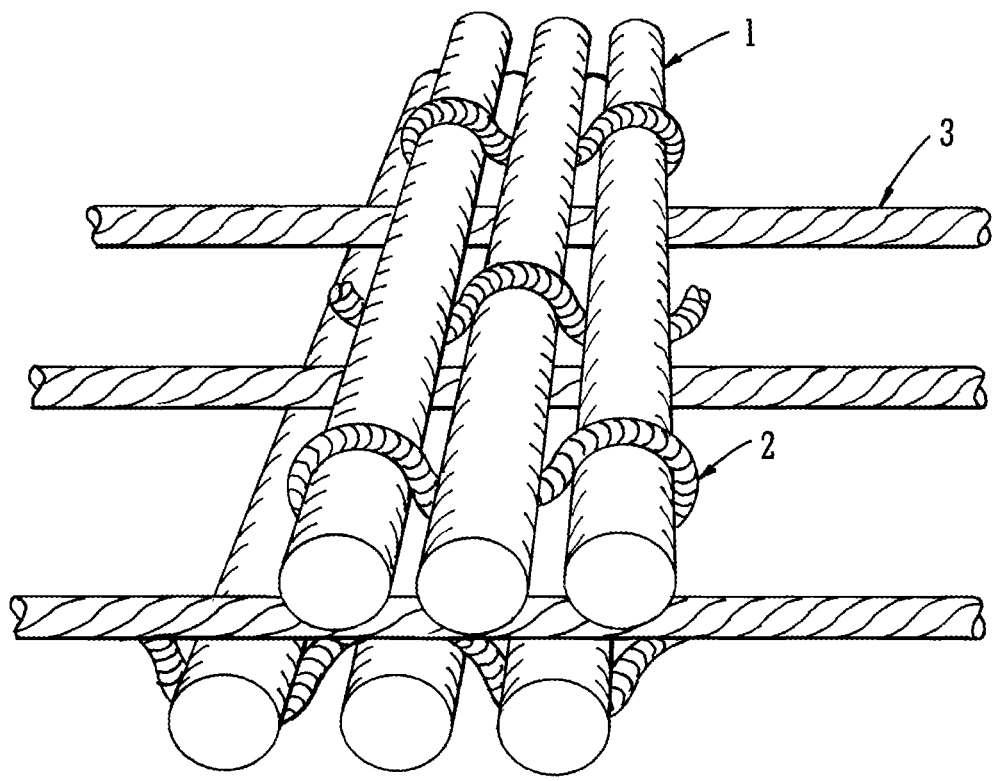

This application is a continuation-in-part of U.S. application Ser. No. 14/915,200, filed Feb. 26, 2016, which is a national phase entry under 35 USC § 371 of International Application No. PCT/EP2014/068413, filed Aug. 29, 2014, which designates the United States of America, which claims priority to UK Application No. 1315363.0, filed Aug. 29, 2013. The entire disclosures of each of these applications are incorporated herein by reference and for all purposes.

The present invention relates to a filter element (such as a filter belt), a horizontal chamber filtration apparatus (such as a tower press) comprising a filter element, and use of a filter element in a horizontal chamber filtration apparatus (such as a tower press).

Filter elements typically comprise woven fabric, that is a fabric comprising warp and weft yarns, wherein the weft is threaded through the warp. Warp yarns are typically longitudinal (i.e. run in the machine direction) and weft yarns are typically transverse (i.e. run perpendicular to the machine direction; the cross-machine direction). Since woven structures possess an inherent degree of stretch, such filter elements are susceptible to elongation when used on large filtration machines where the elements are placed under tension. This is particularly true in vertical tower presses, since a filter element in the form of a filter belt zig-zags down the machine and may be up to around 200 m long. This can mean significant elongation and a 'stretch' of several metres in total. As the filter element elongates it is exposed to greater loads, and so elongation is an ever increasing problem. This can lead to premature failure of the belt, possible damage to the filtration apparatus, and/or poor tracking of the belt leading to edge damage. Consequently it is desirable to reduce the susceptibility of filter elements to elongation, and/or to increase their modulus. In addition, filter elements are susceptible to abrasion, for example due to the presence of abrasive particles in the filtrate and/or from the filtration apparatus itself. Such abrasion reduces the working life of the filter element. It is therefore desirable to additionally improve the abrasion resistance of filter elements in order to prolong their working life.

According to a first embodiment of the present invention, there is provided a filter element comprising weft, warp and laid-in yarns, wherein the laid-in yarns do not interlace with the weft yarns and run substantially parallel to the warp yarns, the weft yarns run substantially perpendicular to the warp yarns, and wherein the ratio of the laid-in yarns to warp yarns is at least 1:4 and the weft yarns comprise an abrasion resistant material, preferably polyamide, e.g. NYLON.

According to a second embodiment of the present invention, there is provided a horizontal chamber filtration apparatus, such as a tower press, comprising a filter element according to the first embodiment.

According to a third embodiment of the present invention, there is provided the use of a filter element according to the first embodiment in a horizontal chamber filtration apparatus such as a tower press.

The laid-in yarns of the present invention give rise to filter elements having an increased modulus, i.e. a reduced tendency to elongation. Without wishing to be bound by theory, it is believed that the laid-in yarns reduce elongation as they do not interlace with any weft yarns, so that any elongation effects due to fabric crimp are reduced. Using laid in yarns in the warp direction, low load elongation values of 0.5% or less @400 N/5 cm are achievable according to DIN EN ISO (13934) without adversely affecting filtration performance. Further, the weft yarns comprising an abrasion resistant material, such as NYLON, give rise to filter elements having improved abrasion resistance. Orienting the filter element such that the laid-in yarns run vertically, parallel with the surface of a filter plate when in use, maximizes the resistance to elongation.

Filter elements typically have top and bottom surfaces, wherein one or both of these surfaces can be used for filtration. When the filter element has weft yarns comprising polyamide, e.g. NYLON, as the predominant yarns on both the top and bottom surfaces of the filter element, it has particularly improved abrasion resistance, and when the filter element has a sateen weave, e.g. a weave of double faced construction comprising polyamide yarns on both surfaces, abrasion resistance is particularly improved.

The filter element ideally comprises at least two layers of weft and in one embodiment comprises only two layers of weft. The weft yarns comprising polyamide can comprise at least 80% wt at polyamide, e.g. NYLON, preferably 100% wt. The laid-in yarns do not interlace with any weft yarns.

When the filter element comprises two layers of weft, the warp yarns interlace with the weft yarns in both layers to link the weft layers. This holds the laid-in yarns in place and prevents relative movement of the weft layers. Crimping of the filter element fabric also helps to retain the laid-in yarns in place between the weft layers.

The ratio of laid-in yarns to warp yarns is at least 1:4, and in various embodiments preferably at least 1:3, more preferably at least 1:2, most preferably at least 1:1, but it can also be 2:3. When the ratio is 1:1, for every laid-in yarn there is an interlacing warp yarn that compresses the laid-in yarn to hold it in place within the woven structure. For example, in a filter element having 5250 warp yarns there will be 2625 laid-in yarns and 2625 interlacing warp yarns that compress the laid-in yarns into the woven structure. The compressive force exerted on the laid-in yarns by the interlacing warp yarns means that the laid in yarns cannot be pulled out unless the woven structure is cut in the longitudinal direction. It will be appreciated that a greater compressive force will be exerted on the laid-in yarns when the ratio of laid-in yarns to warp yarns is 1:2, 1:3 or 1:4 for example.

The laid-in yarns might in one embodiment comprise any one of polypropylene (PP), polyester (PET), polyethylene (PE), polybutylene terephthalate (PBT), polyphenylene sulfide (PPS) and/or aramid such as KEVLAR materials. In one embodiment their linear density is from 150 to 4400 dtex (grams/10,000 m), and in another embodiment from 1100 to 2200 dtex. The laid-in yarns can be multifilament staple or monofilament.

The warp yarns might in one embodiment comprise any of PP, PET, PE, PBT, PPS or Kevlar material. In one embodiment their linear density is from 150 to 4400 dtex. In another embodiment this is from preferably 1100 to 2200 dtex.

The warp yarns can be multifilament staple or monofilament, and/or the warp yarns can be woven in any of plain weave, all twill combinations, or all satin combinations.

The weft yarns typically comprise abrasion resistant material such as NYLON (PA), and may also typically comprise PP, PET, PE, PBT, PPS or aramid (e.g. KEVLAR) material. In one embodiment the weft yarns consist essentially of, or consist of, NYLON (PA). In one embodiment their linear density is from 150 to 4400 dtex. In another embodiment this is from 1100 to 2200 dtex. The weft yarns can be multifilament staple or monofilament.

The filter element may comprise at least 28 warp yarns/cm. This high thread count enables a compressive force to be exerted on the laid-in yarns that is sufficient to retain the laid-in yarns in place between the weft layers. In some embodiments the filter element may comprise at least 41 warp yarns/cm.

An abrasion resistant coating, for example of glue or resin, may optionally be applied to the filter element to increase lifetime. This coating may be (but is not limited to), for example, a two part epoxy or similar. Typically, the coating is an aqueous Phenol Formaldehyde resole system. The coating can also be impregnated into the fabric of the filter element.

When a woven filter element is cut to the desired dimensions, it's possible to pull the warp and weft yarns from the woven structure. Therefore, to avoid the warp and weft yarns unraveling during use the cut edges are typically sealed using ultrasonic technology. In particular, a sonotrode may be provided to deliver ultrasound energy through the yarns of the filter element to an anvil such that the fabric surface is transformed. The design of the anvil imparts parallel or diagonal lines down the cut edges which binds the warp, weft and laid-in yarns together thereby sealing the edge. It will be appreciated that any technology capable of sealing the edges could be used and that sealing the edges of the filter element also contributes to holding the laid-in yarns in place between the interlacing warp and weft yarns and prevents fraying of adjacent weft layers.

In some embodiments the filter element is a filter belt. The filter belt may comprise a seam for joining the respective ends of an open-ended belt to form an endless belt. For example, the seam could include clipper seams, splice seams, inline (spiral seams), pin seams, slim seams, sewn spiral seams and protection seams. Joining the respective ends of an endless belt by a seam helps to secure the laid-in yarns between the interlaced warp and weft yarns. The coating can be typically applied using a coating machine comprising a simple Knife over Air system, with a 1' blade, which causes the resin to be forced into the filter element, thus giving an impregnation, rather than a discrete coating on top of the filter element. The coating should not, however, markedly alter the permeability of the filter element.

Usually the filter element is first coated and dried, and then cured preferably by passing down a stenter. Afterwards, hot calandering, at for example 145° C., is preferred. Curing the filter element causes bonds to form between the laid-in yarns and the interlaced warp/weft yarns that may help to hold the laid-in yarns in place within the woven structure.

The present invention will now be illustrated, by way of example only, by reference to FIG. 1 which shows a schematic diagram of a filter element according to the invention.

In FIG. 1, two layers of weft yarns 1 and warp yarns 2 are interlaced to create a fabric, wherein the weft yarns run perpendicular to the machine direction and the warp yarns run parallel to it. Although not shown in FIG. 1, the warp yarns 2 interlace weft yarns 1 in the two weft layers to link the two weft layers. Laid-in yarns 3 placed in-between the two weft layers also run parallel to the machine direction. There is a laid-in yarn present between each pair of warp yarns, such that the ratio of laid-in yarns to warp yarns is 1:1. The weft yarns 1 comprise an abrasion resistant material such as NYLON.

Figure 2:
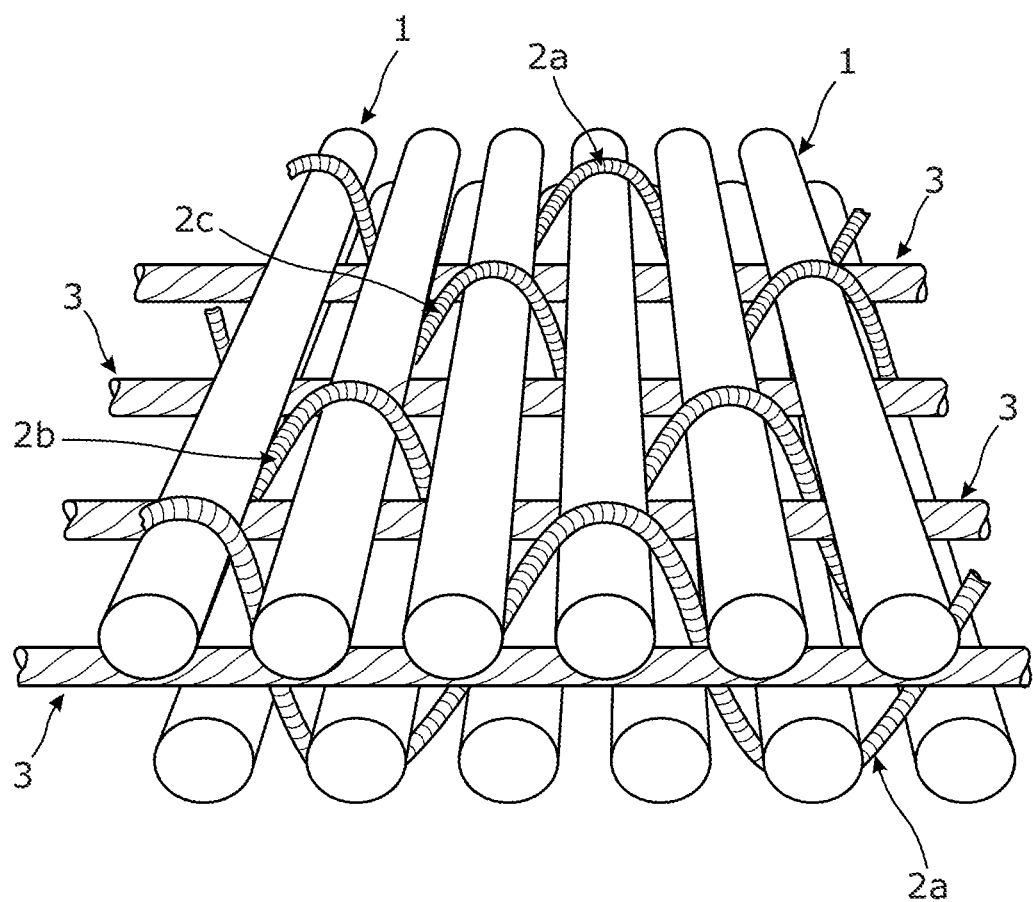

In FIG. 2, two layers of weft yarns 1 and warp yarns 2 are interlaced to create a fabric, wherein the weft yarns run perpendicular to the machine direction and the warp yarns run parallel to it. The warp yarns 2a, 2b and 2c interlace the weft yarns 1 to link the two weft layers. Laid-in yarns 3 placed in-between the two weft layers also run parallel to the machine direction. In this embodiment, the ratio of laid-in yarns 3 to warp yarns 2 is 1:1. The weft yarns 1 comprise an abrasion resistant material such as NYLON.

A filter element according to the invention, labelled V6 in the below tables, has been tested for abrasion resistance and extension resistance against standard Clear Edge and competitor (Tamfelt) materials.

The abrasion resistance was tested using a NuMartindale Abrasion Tester with single line test mode with a pressure of 12 kPa with 50 cycles per minute. The sandpaper used was Klingspor PSIIC (240 grain), and circular test samples of 140 mm in diameter were used. Samples were loaded in such a way that the cake side was in contact with the sandpaper. The results achieved were as follows in Table 1:

TABLE 1

| Clear Edge product ref | After 100 cycles | After 500 cycles | After 2000 cycles | After 5000 cycles | After 8000 cycles | After 11000 cycles | After 13000 cycles | After 17000 cycles | After 19000 cycles | After 24000 cycles | After 30000 cycles | After 35000 cycles |
|---|---|---|---|---|---|---|---|---|---|---|---|---|
| 98430F | Fine dust | Hairy surface | Hairy surface | Hairy surface and warp flattens up. Fine dust | Hairy surface and fine dust | Fine dust and hairy surface | Fabric failed | — | — | — | — | — |
| 25330B | Fine dust and hairy surface | Hairy surface | Hairy surface | Hairy surface | Wefts exposed. Failure appear | Pin holes in one row. Fabric fails | Fabric failed | — | — | — | — | — |
| 98320K | Fine dust and hairy surface | Hairy surface | Hairy surface | Hairy surface | Hairy surface | Hairy surface | Hairy surface | Fabric failed. Warp completely abrades off | — | — | — | — |
| 97770F | Fine dust and hairy surface | Hairy surface | Hairy surface | Hairy surface | Hairy surface and warp flattens up. Fine dust | Fine dust and hairy surface | Hairy surface | Fabric failed | — | — | — | — |

TABLE 1-continued

| Clear Edge product ref | After 100 cycles | After 500 cycles | After 2000 cycles | After 5000 cycles | After 8000 cycles | After 11000 cycles | After 13000 cycles | After 17000 cycles | After 19000 cycles | After 24000 cycles | After 30000 cycles | After 35000 cycles |
|---|---|---|---|---|---|---|---|---|---|---|---|---|
| V6 (fabric of the invention) | Fine dust and hairy surface | Fine dust and hairy surface | Fine dust and hairy surface | Fine dust and hairy surface | Fine dust and hairy surface | Fine dust and hairy surface | Fine dust and hairy surface | Fine dust and hairy surface | Hairy surface and weft appears on the surface | Fine dust and hairy surface | Fine dust and hairy surface | Fabric failed |

As can be seen, the V6 (which is the product according to the invention) shows the highest abrasion resistance as compared to the other standard Clear Edge Fabrics.

The extension resistance of the V6 product was tested as compared to competitor's products (by Tamfelt) and as compared to other Clear Edge products. Testing was done by measuring (i) how much load must be attached per tensile metre in the warp direction to achieve 2% elongation, and (ii) the % elongation in the warp direction at a load of 400 N. As can be seen from table 2, the V6 (product according to the invention) has most favourable load characteristics.

TABLE 2

| Reference | (i) Low Load N/5 cm @ 2% | (ii) Low Load % @ 400 N |
|---|---|---|
| Tamfelt S 2206-L1 K4 | 600 | 1.6 |
| Tamfelt S 2106-L1 | 1000 | 1.1 |
| Tamfelt S 2102-L1 K4 | 1000 | 1.1 |
| Tamfelt S 2104-L1 | 1000 | 1.1 |
| Tamfelt S 2123-L1 | 1200 | 1.0 |
| Tamfelt S 2110-L1 | 850 | 1.3 |
| Tamfelt S 2209-L1 | 900 | 1.0 |
| Clear Edge 98320F | 1600 | 0.7 |
| Clear Edge 97630F | 1400 | 0.7 |
| Clear Edge 97770F | 900 | 1.2 |
| Clear Edge 18830F | 1200 | 0.9 |
| Clear Edge 98320F | 1600 | 0.7 |
| Clear Edge V6 | 1900 | 0.45 |

It is to be understood that the above described embodiment is by way of illustration only. Many modifications and variations are possible. For example three or more layers of weft may be provided in the filter.

The invention claimed is:

1. A filter belt comprising interlaced weft and warp yarns, and laid-in yarns, wherein:
    the filter belt comprises two layers of weft yarns, with the laid-in yarns located between said layers of weft yarns;
    the laid-in yarns do not interlace with the weft yarns and run substantially parallel to the warp yarns, the laid-in yarns having a linear density of 150 to 4400 dtex (grams/10,000 m);
    the weft yarns run substantially perpendicular to the warp yarns;
    the warp yarns are interlaced between the two layers of weft yarns to provide a compressive force to hold the laid-in yarns between the interlaced warp and weft yarns, and wherein;
    the ratio of the laid-in yarns to warp yarns is at least 1:4 and the weft yarns comprise an abrasion resistant material.

2. A filter belt according to claim 1, wherein the abrasion resistant material comprises polyamide.

3. A filter belt according to claim 1, wherein the weft yarns are the predominant yarn on both the top and bottom surfaces of the filter belt.

4. A filter belt according to claim 1, wherein the weft yarns are woven in a double-faced sateen construction.

5. A filter belt according to claim 1, wherein the ratio of laid-in yarns to warp yarns is approximately 1:1.

6. A filter belt according to claim 1, wherein the laid-in, warp and/or weft yarns comprise any of the following either alone or in combination: PP, PET, PE, PBT, PPS and/or aramid materials.

7. A filter belt according to claim 1, wherein the weft yarns consists essentially of polyamide.

8. A filter belt according to claim 1, wherein the filter belt additionally comprises an abrasion resistant coating.

9. A horizontal chamber filtration apparatus, such as a tower press, comprising a filter belt according to claim 1.

10. A filter belt according to claim 1, wherein the laid-in yarns have a linear density of 1100 to 2200 dtex (grams/10,000 m).

* * * * *